United States Patent [19]

Wolfson et al.

[11] Patent Number: 4,727,979
[45] Date of Patent: Mar. 1, 1988

[54] CONVEYOR HANGER WITH A PLURALITY OF MOVABLE GRIP ELEMENTS

[75] Inventors: Lawrence S. Wolfson; David R. Pearl, both of West Hartford; Richard P. Ray, Coventry; Roald P. Nymark, Simsbury; Harold Osthus, S. Willington, all of Conn.; David Vickers, Worsley, England

[73] Assignee: Gerber Garment Technology, Inc., Tolland, Conn.

[21] Appl. No.: 794,630

[22] Filed: Nov. 4, 1985

Related U.S. Application Data

[63] Continuation-in-part of Ser. No. 6,651,425, Sep. 17, 1984, abandoned.

[51] Int. Cl.$^4$ ............................................. B65G 47/86
[52] U.S. Cl. ............................... 198/803.3; 198/803.7; 294/103.1; 294/81.6; 294/143
[58] Field of Search ............ 198/803.3, 803.7, 803.14, 198/465.4, 678; 294/103.1, 81.6, 143, 162; 248/316.7; 211/89, 45

[56] References Cited

U.S. PATENT DOCUMENTS

| 1,522,923 | 1/1925 | Smith et al. | 198/803.3 |
| 2,521,604 | 9/1950 | Provost | 211/45 X |
| 2,755,585 | 7/1956 | Lubow | 211/45 X |
| 4,085,848 | 4/1978 | Tsuge | 211/45 |

FOREIGN PATENT DOCUMENTS 2016071  9/1979  United Kingdom .

Primary Examiner—Robert J. Spar
Assistant Examiner—D. Glenn Dayoan
Attorney, Agent, or Firm—McCormick, Paulding & Huber

[57] ABSTRACT

A hanger for use with a conveyor in a garment making plant or the like for holding limp sheet material includes a hanger rod for attachment to a conveyor trolley and a hanger body carrying, and forming in part, a plurality of grippers, each capable of holding a workpiece unit to the body. Each gripper is made up of a stationary gripping face on part of the hanger body and a grip elememnt supported for movement along a path giving it a wedging action on a work unit inserted in the gripper when the grip element is urged downwardly by the weight of the work unit and its engagement therewith.

20 Claims, 17 Drawing Figures

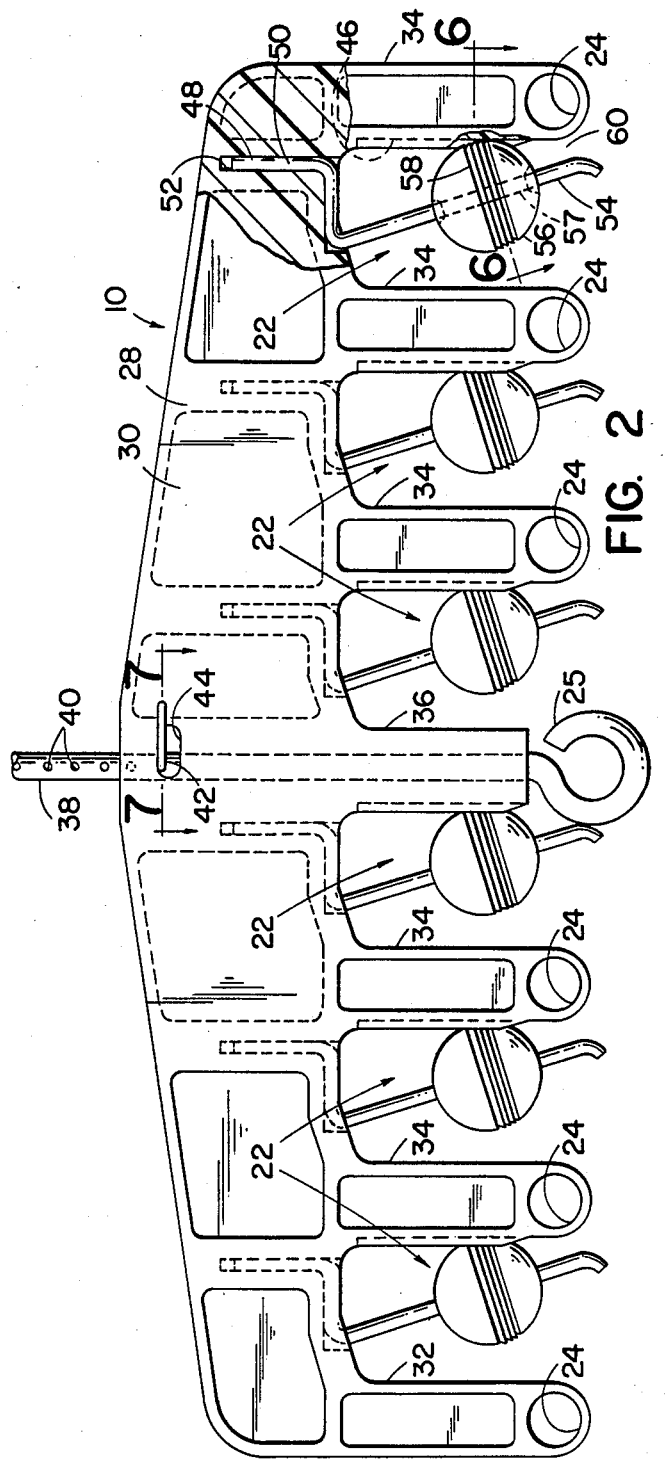
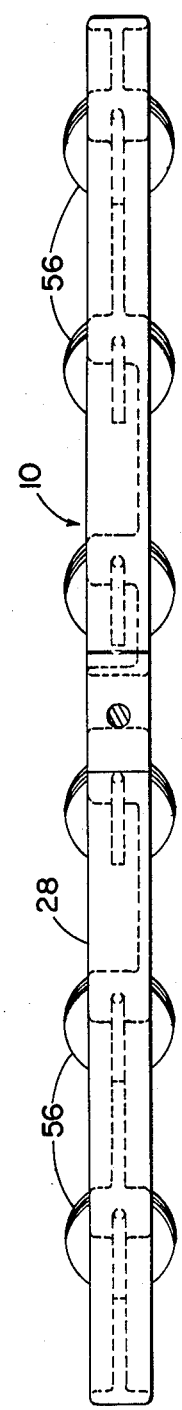
FIG. 2
FIG. 3

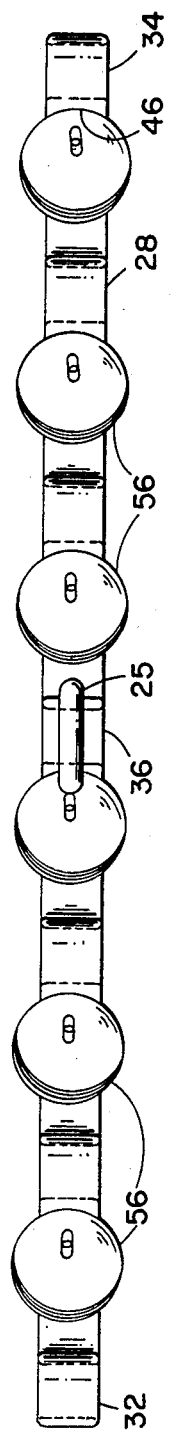

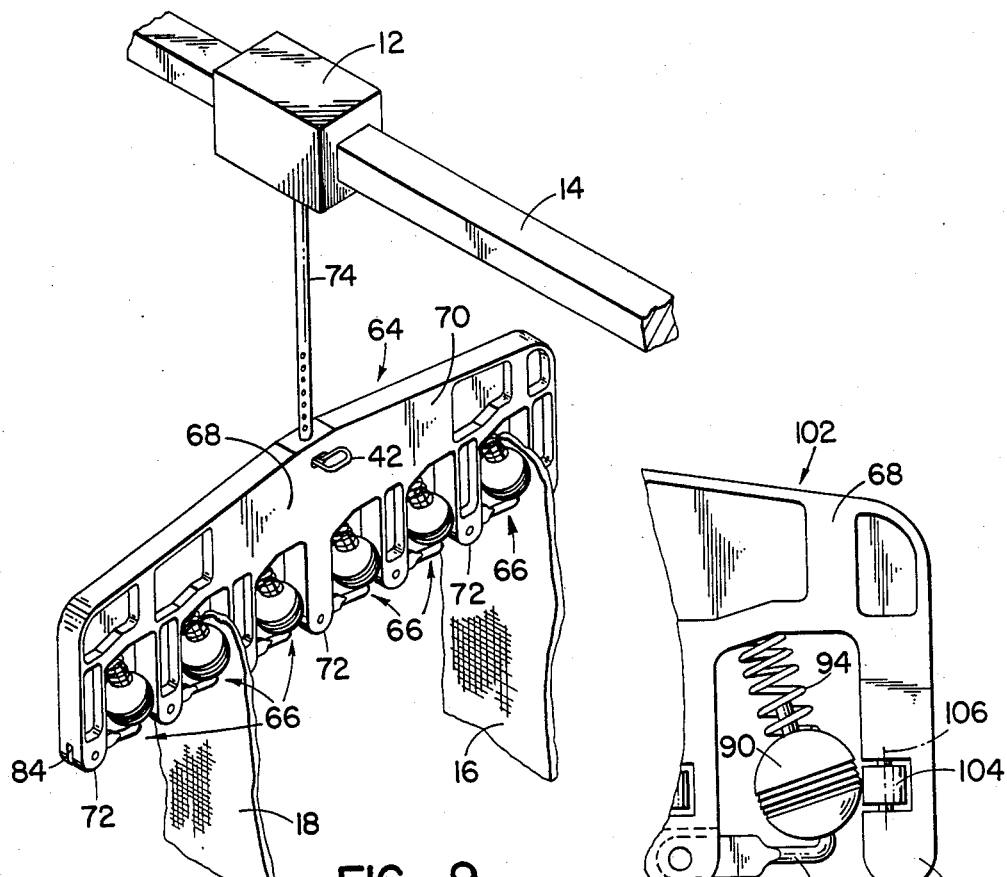
FIG. 9
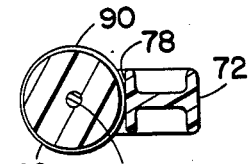
FIG. 14
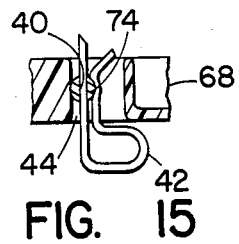
FIG. 15
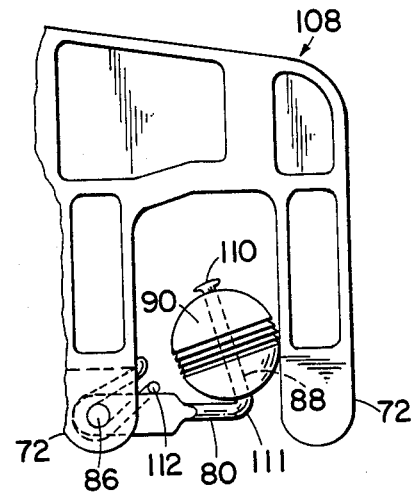
FIG. 16
FIG. 17

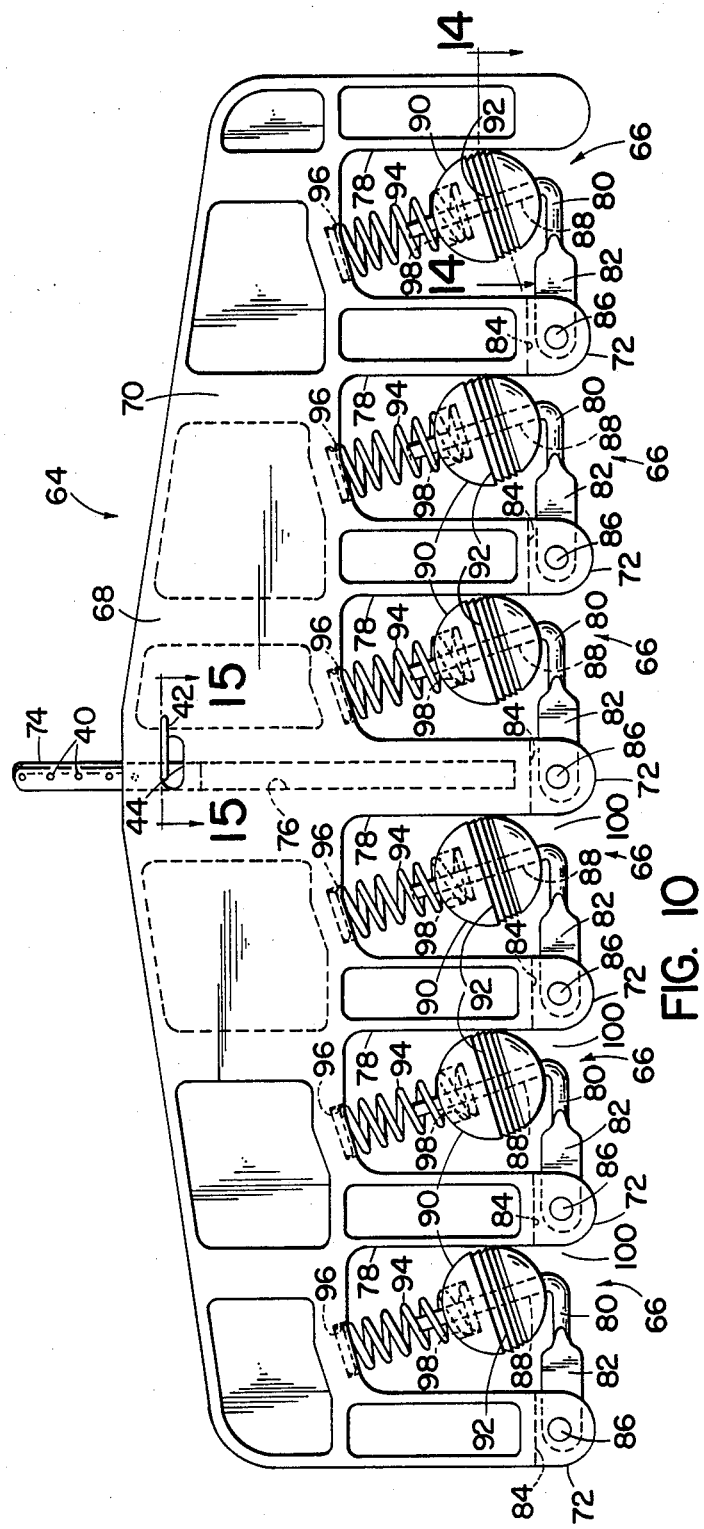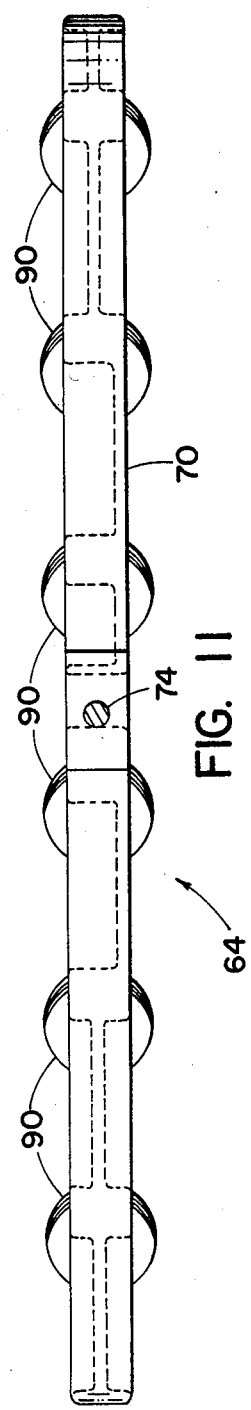

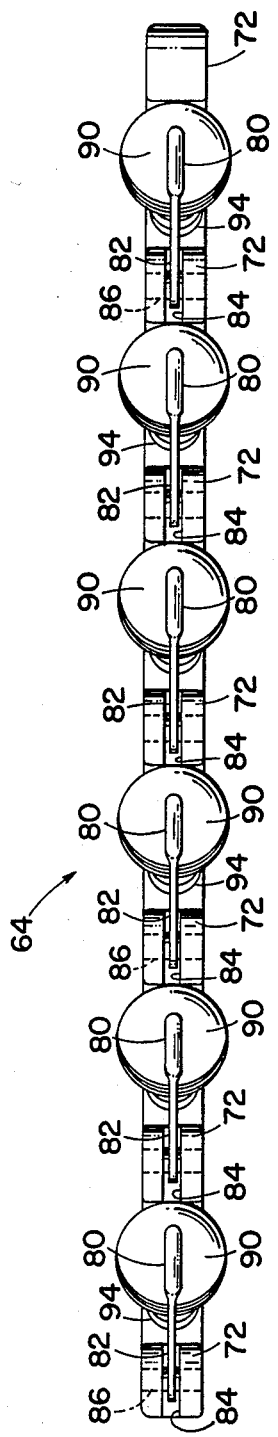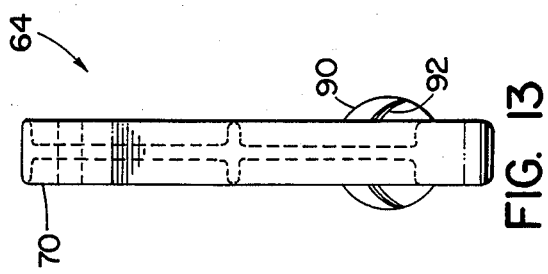
FIG. 12
FIG. 13

CONVEYOR HANGER WITH A PLURALITY OF MOVABLE GRIP ELEMENTS

CROSS-REFERENCE TO RELATED APPLICATION

This application is a continuation-in-part of pending application Ser. No. 06/651,425, filed by LAWRENCE S WOLFSON on Sept. 17, 1984, now abandoned, and entitled CONVEYOR HANGER WITH GRIP ELEMENT OF SUPPORTING SPRING.

BACKGROUND OF THE INVENTION

This invention relates to a hanger for holding pieces of limp material such as textile garment pieces either as individual pieces or as groups or stacks of such pieces and for attachment to a conveyor trolley for moving the pieces from work station to work station in a conveyorized garment making plant or the like, and deals more particularly with an improved construction of such a hanger having a plurality of grippers for releasably holding a plurality of work material units to the hanger.

In the garment making industry, the upholstery industry and other industries involved in making articles from pieces of fabric or other limp sheet material by performing various operations on such pieces, such as seam sewing, hemming, embroidering, buttonholing, appliquing, etc., at different work stations, it is known to convey pieces of work material in various different states of completion, and as individual pieces or stacks or groups of pieces, from work station to work station by a conveyor system including overhead rails and switches, trolleys riding on the rails and hangers hanging from the trolleys, with the hangers having some means for releasably holding the workpieces to the hanger. Preferably, the holding means of each hanger should be able to hold workpieces of different size and weight, should be able to hold either a single workpiece or a stack or group of such workpieces, should be easy to operate as far as the loading and unloading of workpieces are concerned and should reliably hold the workpieces to the hanger between the loading and unloading operations. Further, since a conveyor system of the type described normally uses a relatively large number of hangers, the hangers should be of relatively simple, economical construction. A hanger may be designed to hold a single workpiece or a single stack or group of such workpieces, but preferably its design is such as to allow it to hold several workpieces or groups or stacks of such pieces at one time.

Also, after a workpiece is loaded into a gripper of the hanger it should thereafter be easy to remove it from the hanger without having to exert much force on the workpiece, this being particularly important in cases where the workpiece is made of a relatively weak or delicate fabric.

The general aim of this invention is therefore to provide a hanger for use in a conveyorized system of the foregoing character having the above-mentioned requirements. A more particular object of the invention is to provide such a hanger including a plurality of improved grippers each of which grippers serves to hold a single workpiece or a group or a stack of workpieces to the hanger and is very easy to operate, allows different types of loading and unloading movements and is very reliable in holding the inserted workpiece or workpieces.

Another object of the invention is to provide a hanger providing a plurality of grippers and wherein each gripper includes a rotatable grip element which rotates and rolls over a workpiece, thereby reducing the amount of force needed to be applied to the workpiece, when a workpiece is removed from the gripper by pulling it horizontally away from the hanger body.

Other objects and advantages of the invention will be apparent from the following description and from the accompanying drawings forming a part thereof.

SUMMARY OF THE INVENTION

The invention resides in a hanger for a conveyorized system for transporting pieces of limp sheet material from work station to work station and involves the hanger including a single body carrying and forming part of a plurality of improved grippers each of which grippers serves to releasably hold a workpiece or a group or stack of workpieces to the hanger.

More specifically, the invention resides in each gripper of the hanger including a downwardly extending portion of the hanger body providing a generally vertical fixed gripping surface, a grip element located adjacent the gripping surface, and a support means supporting the grip element for movement in a vertical plane generally perpendiuclar to the gripping surface and along a path such that as the grip element moves upwardly it moves horizontally away from the gripping surface and such that as said grip element moves downwardly it moves horizontally toward the gripping surface so that the downward force exerted on the grip element by a unit of work received between the grip element and the gripping surface moves the grip element closer to the gripping surface and thereby increases the gripper's grip on the work unit. The support means for the grip element may be either an inclined member fixed to the hanger body and along which the grip element slides or a lever carrying the grip element and pivotally connected to the hanger body.

The invention still more specifically resides in the grip element of each gripper being a body of revolution, such as a sphere or ball, rotatably mounted on its support so that when a work unit is removed from the gripper by pulling it horizontally away from the hanger the grip element will rotate and roll over the surface of the work unit to reduce the amount of force needed to effect the removal, the grip element also having a series of ribs concentric with the rotational axis.

BRIEF DESCRIPTION OF THE DRAWINGS

FIG. 2 is a front elevational view of the hanger of FIG. 1.

FIG. 3 is a top view of the hanger of FIG. 1.

FIG. 4 is a bottom view of the hanger of FIG. 1.

FIG. 5 is a a side view of the hanger of FIG. 1 taken looking toward the left in FIG. 2.

FIG. 6 is a sectional view taken on the line 6—6 of FIG. 2.

FIG. 7 is a fragmentary sectional view taken on the line 7—7 of FIG. 2.

FIG. 8 is a fragmentary elevational view similar to a fragment of FIG. 2 but showing a hanger comprising an alternate embodiment of the invention.

FIG. 9 is a perspective view showing a portion of a conveyor system using a hanger comprising another embodiment of the present invention, the parts of the conveyor apart from the hanger being shown only schematically.

FIG. 10 is a front elevational view of the hanger of FIG. 9.

FIG. 11 is a top view of the hanger of FIG. 9.

FIG. 12 is a bottom view of the hanger of FIG. 9.

FIG. 13 is a side view of the hanger of FIG. 9 taken looking toward the left in FIG. 10.

FIG. 14 is a sectional view taken on the line 14—14 of FIG. 10.

FIG. 15 is a fragmentary sectional view taken on the line 15—15 of FIG. 10.

FIG. 16 is a fragmentary elevational view similar to a fragment of FIG. 10 but showing a hanger comprising an alternate embodiment of the invention.

FIG. 17 is a fragmentary elevational view similar to a fragment of FIG. 10 but showing a hanger comprising yet another embodiment of the invention.

DETAILED DESCRIPTION OF THE PREFERRED EMBODIMENT

Figure 1:
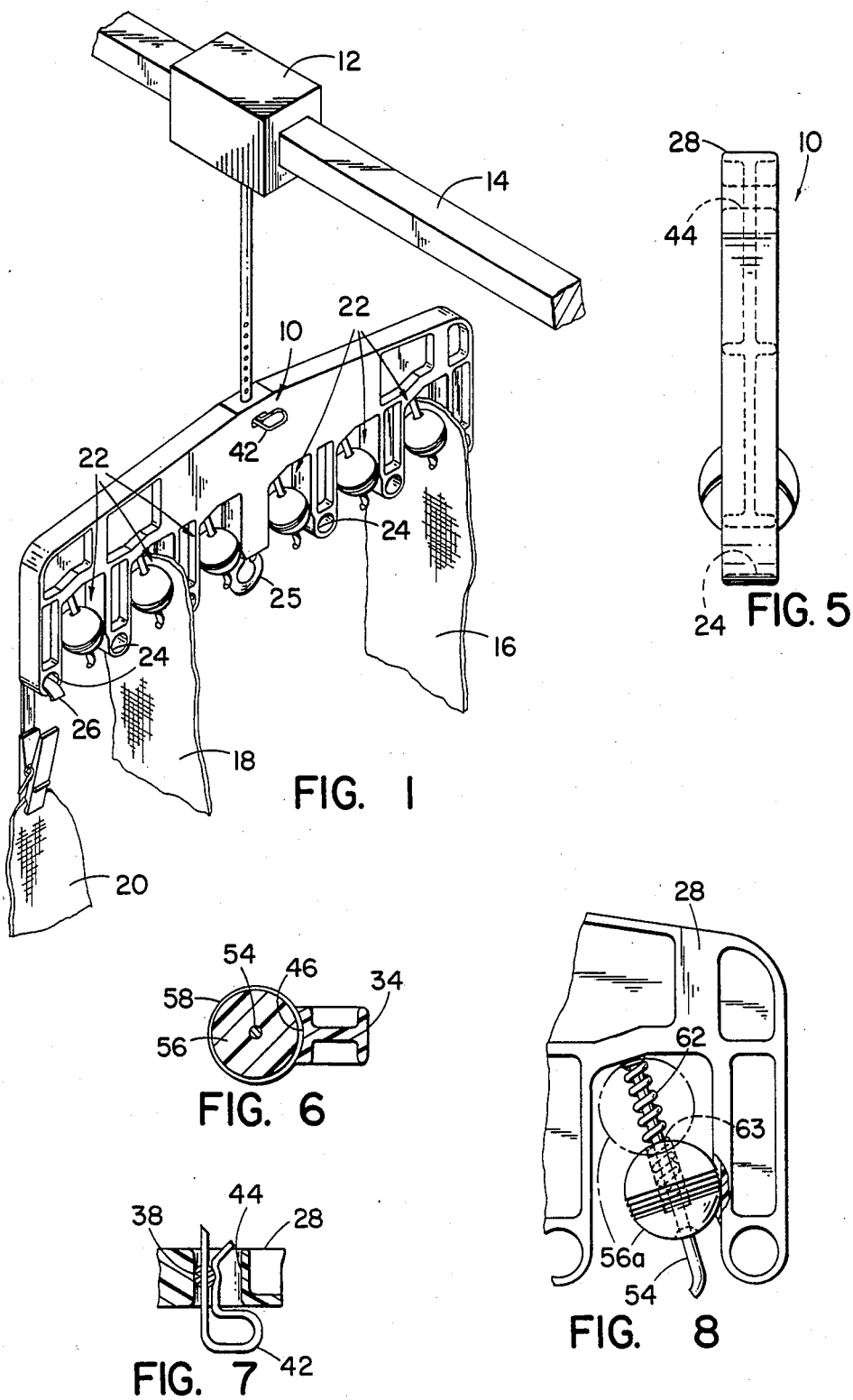
FIG. 1 is a perspective view showing a portion of a conveyor system using a hanger embodying the present invention, the parts of the conveyor apart from the hanger being shown only schematically.

Referring to FIG. 1, a hanger embodying the invention is illustrated at 10 and is connected to a trolley 12 riding on a rail 14, all of which may form a part of a conveyor system for transporting limp sheet material, such as indicated at 16, 18 and 20, from work station to work station in a garment making plant or the like. The trolley 12 and track 14 may take any one of various well-known forms and, as is also well known, the track 14 usually has associated with it a moving chain or other powered element for moving the trolley 12 along the track, and switches are generally included in the system for directing the trolleys and hangers to various desired points in the plant. When a trolley and associated hanger 10 reach a work station the trolley is generally separated or separable from the driving chain or the like so that the trolley and hanger can remain stationary relative to the work station while the operator loads and/or unloads material onto or from the hanger.

Each of the quantities of material 16, 18 and 20, hung from the hanger 10 in FIG. 1 may consist of either a single workpiece or a group or stack of such workpieces, for example a stack a quarter-inch thick or more made up of a number of layers of workpieces, and each workpiece may be in any given state of completion. That is, each workpiece for example may be a single cut unworked pattern piece, a single pattern piece already worked with embroidery, buttonholing, hemming or the like, or a number of sewn together pattern pieces further worked with embroidery, smocking, appliquing, etc. In the following discussion, including the claims, a quantity of work material such as indicated at 16, 18 and 20 in FIG. 1, will be sometimes referred to as a "unit" of work material with it being understood that such "unit" may consist of either a single workpiece layer or a number of workpiece layers superimposed to form a somewhat loose group or a more neatly layered stack.

A workpiece hanger embodying the invention includes a plurality of grippers each serving to hold one workpiece unit, thereby making the hanger capable of holding a number of units at one time. As illustrated in FIG. 1 and FIG. 2, the hanger 10 includes six grippers indicated generally at 22, 22, for holding as many as six workpiece units such as the two shown at 16 and 18. These grippers 22, 22 directly hold workpiece units to the hanger 10. Sometimes it may also be desired to indirectly hold one or more workpiece units from the hanger through an auxiliary hanger, and for this purpose the hanger 10 also includes a number of eyes 24, 24 and 25 from each of which such an auxiliary hanger may be hung. An example of this in FIG. 1 is illustrated by the work unit 20 which is hung from one eye 24 by means of an auxiliary hanger 26. This auxiliary hanger 26 may, for example, consist of a clothespin-type clamp which grips the work unit 20 and having a hook member insertable in the eye 24 as shown.

Reference may now be made to FIGS. 2 to 7 for further details of the construction of the hanger 10 of FIG. 1. The hanger consists of a body 28 made of a rigid material. This material may be wood, metal or plastic, and in a preferred case is a molded acetal plastic such as nylon. The body 28 has a horizontally elongated upper portion 30 from which protrude seven horizontally spaced downwardly extending portions or fingers comprised of the two illustrated fingers 32 and 36 and the four illustrated fingers 34, 34 best seen in FIG. 2. The body may be made as a solid construction but preferably both the upper portion 30 and the fingers, except for the finger 36, are of ribbed cross sections, as evident from the drawings, to reduce the weight of and material required by the body while nevertheless preserving a high degree of rigidity.

The hanger body 28 is supported from the conveyor 12 by a hanger rod 38 which passes vertically through the body, through the central finger 36. The body is vertically slidable on the rod 38 and the rod includes a number of through openings 40, 40 for selectively receiving a clip pin 42 to hold the body in a selected position along the length of the rod to adjust the height of the hanger body from the floor of the plant. In connection with this, the pin 42 is accommodated by a through slot 44 in the hanger body 28 as seen in FIGS. 2 and 7. The lower end of the hanger rod 38 protrudes below the lower end of the central finger 36 and is formed to define the eye 25 from which a supplemental hanger may be hung. The lower ends of the other fingers have through holes defining the other eyes 24, 24.

Each of the six grippers 22, 22 of the hanger 10 includes a fixed generally vertically extending gripping surface 46 on one of the fingers 34, 34 or 36. Associated with this gripping surface is a grip element support member 48 made of a bent length of metal wire or rod. The upper end 50 of this member is inserted in an opening 52 in the upper portion 30 of the hanger body and is secured in such opening by suitable means such as a press fit and/or adhesive. An elongated leg 54 of the member 48 extends downwardly from the upper portion 30 of the hanger body opposite to the associated stationary gripping surface 46, is located in a plane generally perpendicular to the gripping surface 46, and is inclined relative to such surface so that its upper end is spaced further from the stationary face 46 than is its lower end. A grip element 56 is slidably received on the leg 54 of the member for movement along its length.

The grip element 56 may take various different shapes, but preferably the leg 54 of the support member 48 is of circular cross section and the grip element 56 is a body of revolution mounted on the leg by means of an opening of circular cross section extending along its axis of revolution so that the grip element is rotatable about such axis relative to the leg. Still more preferably the grip element is in the form of a generally spherically shaped ball as shown, mounted on the leg 54 for rotation about a diametral axis, the ball having a diametral through opening 57 for slidably and rotatably receiving the leg 54, and the opening 57 and leg 54 having generally circular cross sections. Also the ball grip element 56 of FIG. 2 preferably has a number of circular grip rings or ribs 58 formed on its outer surface concentric with its diametral opening 57 to provide a better purchase on the work unit inserted between the ball grip 56 and the associated stationary gripping surface 46. After the ball is placed on the leg 54, during assembly of the hanger 10, the very lower end of the leg is bent away from the associated gripping face 46 to retain the ball on the leg and to provide a flared mouth 60 for the insertion of the work unit into the gripper. The support member 48 may be made of spring material and be of such size that the leg 54 acts as a spring enabling the lower end of the leg to be resiliently moved away from its neutral position by a horizontal face, but this is not necessary in all cases and if desired the element may be made of less springy material and/or of thicker size so as to be relatively rigid.

In a loading operation involving a gripper 22 of the hanger 10 the upper edge portion of a work unit is inserted in the flared mouth 60 of the gripper and pushed upwardly. This displaces the grip element 56 upwardly on the leg 54 to allow entry of the work unit into the gripper. Since the ball grip element 56 is rotatable relative to its support leg the inserting movement may include some horizontal component of motion perpendicular to the hanger body 28 and when such horizontal component of motion is present the grip element 56 will roll over the work unit to ease it insertion. After the work unit has been entered to a sufficient degree, the manual lifting force can be removed to allow the work unit to tend to drop downwardly by gravity. This, however, also, through engagement of the work unit with the grip element 56, moves the element 56 downwardly with the material causing the work unit to become wedged between the ball grip element 56 and the stationary gripping surface 46, with the ball resiliently moving away from the fixed gripping surface 46 under the biasing influence of the leg 54, if the leg is designed to have some degree of springiness, to accommodate the thickness of the unit. In connection with this it should be noted from FIG. 4 that the illustrated stationary gripping surface 46 is rounded or concave in horizontal cross section as shown to match the shape of the associated ball grip element 56 to increase the length of the engagement between the active surfaces of the gripper and the work unit inserted in the gripper. This however is a matter of choice and if desired the stationary gripping surface 46 may be made planar or of some other convenient shape. In any event, the gripper exerts a holding force on the inserted work unit sufficient to reliably hold it in place on the hanger as the hanger is moved by the conveyor system from work station to work station.

In an unloading operation involving a gripper 22, an operator at a work station may remove a work unit from a gripper of the hanger by merely pulling downwardly on the work unit to create a downward force overcoming the gripping force imposed by the gripper. The amount of force required to effect such removal is related to the springiness of the leg 54, with the amount of force generally increasing with increases in the stiffness of the legs. Therefore, if this manner of removal is expected to be used the leg should be designed to have some reasonable degree of springiness. However, since the ball grip element 56 is rotatively mounted on the spring leg 54 the work unit may also be removed by pulling it horizontally in a direction generally perpendicular to the hanger body causing the ball grip element 56 to roll over the work unit and the work unit to slide laterally over the stationary grip surface 46. If only this form of removal is expected to be used the leg 54 may be designed to be relatively stiff.

The illustrated ball grip element 56 of each gripper 22 may be made of various different materials, but in a presently preferred form of the hanger it is made of an acetal plastic such as nylon. Generally, gravity is sufficient to achieve proper operation of a ball grip element 56. However, in another embodiment of the invention, as shown in FIG. 8, a spring 62 may be used to bias the ball grip element 56a to its gripping position. As illustrated in FIG. 8 such spring 62 is a helical spring received on the support leg 54 above the ball grip element 56a and working between the body and the ball grip to urge the grip element downwardly on the leg 54. In this case the grip element 56a as illustrated includes a counterbore 63 in the upper portion of its diametral opening for accommodating all or most of the spring 62 when the grip element 56a is moved to its uppermost position on its spring leg 54.

An important feature of the invention is that the grip element be movable relative to the stationary gripping surface so that the grip element is moved toward the stationary gripping surface when the grip element is urged downwardly by its engagement with a work unit inserted in the gripper, with the grip element also preferably being a ball or other body of revolution rotatably mounted on its support to allow a work unit to be pulled horizontally from the hanger with the grip element rolling over the surface of the unit. In FIGS. 1 to 8 the illustrated hangers are ones using an inclined leg slidably supporting the grip element to achieve the desired path of motion of the grip element relative to the stationary gripping surface, but other forms of support for a grip element may be provided in keeping with the invention. As an example of this FIGS. 9 through 17 show other hangers in which each gripper of the hanger includes a grip element supported on a lever pivotally connected to the hanger body to provide the desired path of movement of the grip element relative to its associated stationary gripping surface.

Referring to FIG. 9, a hanger embodying the invention is there illustrated at 64 and is connected to a trolley 12 riding on a rail 14 such as previously described. The hanger 64 includes six grippers indicated generally at 66, 66 for holding as many as six workpiece units such as the two shown at 16 and 18.

Referring to FIGS. 10 to 15 for further details of the construction of the hanger 64 of FIG. 9, the hanger consists of a body 68 made of a rigid material. This material may be wood, metal or plastic, and in a preferred case is a molded acetal plastic such as nylon. The body 68 has a horizontally elongated upper portion 70 from which protrude seven horizontally spaced downwardly extending portions or fingers 72, 72. The body may be made as a solid construction but preferably both the upper portion 70 and the fingers 72, 72, except for the middle finger, are of ribbed cross sections, as evident from the drawings, to reduce the weight of and material required by the body while nevertheless preserving a high degree of rigidity.

The hanger body 68 is supported from the conveyor 12 by a hanger rod 74 which extends into a vertical opening 76 passing through the upper portion 70 of the body and into the middle finger 72. The body 68 is vertically slidable on the rod 74 and the rod includes a number of through openings 40, 40 for selectively receiving a spring clip 42 to hold the body in a selected position along the length of the rod to adjust the height of the hanger body from the floor of the plant. The pin is accommodated by a slot 44 extending horizontally through the hanger body 68 as seen in FIGS. 10 and 15.

Each of the six grippers 66, 66 of the hanger 64 includes a fixed generally vertically extending gripping surface 78 on one of the fingers 72, 72. Associated with the gripping surface is a grip element support member in the form of a lever 80 made of a bent length of metal wire or rod. As seen in FIG. 10 the left-hand portion 82 of each lever is flattened and is received in a slot 84 in the lower end of a neighboring finger 72 to which finger it is pivotally connected by a pivot pin 86. To the right of its flattened portion 82 each lever 80 is of round cross-section and is bent upwardly to provide a support arm 88 for the associated grip element 90 which is slidably and rotatably received on the arm 88.

The grip element may take various different shapes, but preferably the support arm 88 of the lever is of circular cross-section and the grip element 90 is a body of revolution mounted on the arm 88 by means of an opening of circular cross-section extending along its axis of revolution so that the grip element is rotatable about such axis relative to the support arm 88. Still more preferably, the grip element is in the form of a generally spherically ball, as shown, mounted on the arm 88 for rotation about a diametral axis. Also, the ball grip element 90, as best seen in FIG. 10, preferably has a number of circular grip rings or ribs 92 formed on its outer surface concentric with its diametral opening to provide a better purchase on the work unit inserted between the ball grip element 90 and the associated stationary gripping surface 78.

Above the grip element 90 of each gripper 66 is a helical compression spring 94 which works and is compressed between the grip element and the upper portion 70 of the hanger body. Preferably, as shown in FIG. 10, the upper portion 70 of the hanger body has a recess 96 for receiving the upper end of each spring 94 and the upper portion of each grip element also has a recess or counterbore 98 for receiving the lower end portion of the associated spring 94. The upper end of each support arm 88 extends somewhat beyond the upper limit of each grip element, as seen in FIG. 10, and is received within the bore or central opening of the associated spring 94.

The springs 94, 94 urge the levers 80, 80 and grip elements 90, 90 of the hanger 64 toward the positions shown in FIG. 10. In a loading operation involving a gripper 66 of the hanger 64 the upper edge portion of a work unit is inserted into the mouth 100 of a gripper and pushed upwardly. This displaces the grip element 90 upwardly by sliding on the support arm 88 and/or by pivoting movement of the lever 80 to allow entry of the work unit into the gripper. Since the ball grip element 90 is rotatable relative to the support arm 88 this inserting movement may include some horizontal component of motion perpendicular to the hanger body 68 and when such horizontal component of motion is present the grip element 90 will roll over the work unit to ease its insertion. After the work unit has been entered to a sufficient degree, the manual lifting force can be removed to allow the work unit to tend to drop downwardly by gravity. This, however, through engagement of the work unit with the grip element 90 and the bias of the spring 94 moves the element 90 downwardly, by sliding on the arm 88 and/or by pivotal movement of the lever 80, causing the grip element at the same time to be moved toward the stationary gripping surface 78 wedging the work unit between the grip element 90 and the stationary gripping surface 78 so that the gripper exerts a holding force on the inserted work unit sufficient to reliably hold it in place on the hanger as the hanger is moved by the conveyor system from work station to work station.

In an unloading operation involving a gripper 66 of the hanger 64, an operator at a work station may perhaps remove a work unit from a gripper of the hanger by pulling downwardly on the work unit to create a downward force overcoming the gripping force imposed by the gripper. However, the grippers 66, 66 of the hanger 64 particularly lend themselves to removal of work units from the hanger by pulling such work units horizontally in a direction away from and generally perpendicular to the hanger body 68. When such a horizontal pull is exerted on a work unit in a gripper the grip element 90 rotates and rolls over the surface of the work unit to reduce the amount of force required for the removal. The stationary gripping surface 78 of each gripper 66 may be curved in horizontal cross section to match the curvature of the associated grip element 90, if desired, but in the illustrated case, as seen in FIG. 14, each such gripping surface 78 is planar so that the associated grip element 90 has substantially a point contact with it.

The illustrated ball grip element 90 of each gripper 66 may be made of various different materials, but in a presently preferred form of the hanger it is made of an acetal plastic such as nylon.

To still further reduce the amount of force required to remove a work unit from a gripper of the hanger 64 the stationary gripping surface 78 may be replaced by a rotatable member which also rotates as a work unit is withdrawn from the gripper by pulling it horizontally. Such a construction is shown in FIG. 16 wherein the illustrated hanger 102 is identical to the hanger 64 of FIGS. 9 to 15 except that a roller 104 is inserted in each finger 72 of the hanger body 68 which would otherwise provide a stationary gripping surface 78, the roller 104 being supported by the finger 72 for rotation about a vertical axis 106 relative to the finger.

When a pivoting lever is used to support the movable grip element of a gripper the grip element may be attached to the lever in various different ways, and also the lever may be biased in various different ways to urge the gripping element toward the associated gripping surface. For example, the grip element may be rotatably supported on the support arm of the lever without any significant freedom to slide relative to the support arm. Also, gravity alone may be used to urge the lever and grip element toward the associated gripping surface without the use of any spring. If a spring is used, it may take different forms and shapes than the illustrated springs 94, 94 of the hanger 64.

FIG. 17, for example, shows another hanger 108, comprising another embodiment of a hanger using levers for supporting the grip elements, wherein each grip element 90 is rotatably attached to the support arm 88 and held from partaking of any substantial degree of sliding movement relative to that arm as a result of the top of the arm being flattened, as at 110, to limit the upward movement of the grip element relative to the arm, the downward movement of the grip element being limited by the adjacent bend or corner 111 in the lever 80. Also, in FIG. 17 the spring 94 of the hanger 64 has been replaced by a clothespin-type torsion spring 112 received on the associated pivot pin 86 and working between the lever 80 and the associated finger 72 to urge the lever 80 to the illustrated position of FIG. 17.

We claim:

1. A hanger for use in a conveyorized system for transporting limp material from work station to work station, with a body having an upper portion and a plurality of grippers associated with said body for each releasably holding a unit of work material, said body being horizontally elongated in a given vertical plane, a plurality of finger portions spaced from one another along the length of said body and extending downwardly from said upper portion, and said plurality of grippers each comprising a generally vertically extending stationary gripping surface generally perpendicular to said vertical plane on a respective one of said finger portions, a grip element located adjacent said gripping surface, and a support means carried by said body and including an elongated support member of generally circular cross-section receiving and supporting said grip element for movement in said vertical plane along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on the said work unit, each of said grip elements being a body of revolution rotatably supported on its associated support member with said support member extending through said body of revolution along its axis of revolution so that said body of revolution may rotate relative to said support member when a unit of work material received between said grip element and said gripping surface is pulled horizontally from said hanger, each of said elements having a given maximum diameter, and each of said fingers having a thickness measured horizontally perpendicular to said vertical plane of approximately the same size as said maximum diameter of grip element.

2. A hanger as defined in claim 1 further characterized by said body of revolution being a ball of generally spherical shape.

3. A hanger as defined in claim 1 further characterized by said support member of each gripper being fixed to said upper body portion and being an elongated leg extending downwardly from said upper body portion generally opposite to said gripping surface of the associated finger portion and inclined so that the upper end of said leg is located farther from said gripping surface then the lower end of said leg, said body of revolution being slidably supported on said elongated leg.

4. A hanger as defined in claim 3 further characterized by said body of revolution being a ball of generally spherical shape and having a diametral through hole receiving said elongated leg for supporting said ball for rotating relative to said leg.

5. A hanger as defined in claim 3 further characterized by a helical coil spring received on said elongated leg above said body of revolution and working between said body of revolution and said upper body portion of said hanger to resiliently urge said body of revolution downwardly on said leg.

6. A hanger for use in a conveyorized system for transporting limp material from work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said finger portions, a grip element located adjacent said gripping surface, and support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and grippng surface on said work unit, said grip element being a ball of generally spherical shape rotatably supported on said support means so as to rotate relative to said support means when a unit of work material received between said grip element and said gripping surface is pulled horizontally from said hanger, and said ball grip element having a plurality of circular ribs concentric with its axis of rotation relative to said support means.

7. A hanger for use in a conveyorized system for transporting limp material from work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said finger portions, a grip element located adjacent said gripping surface, and support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit, said grip element being a body of revolution rotatably supported on said support means so as to rotate relative to said support means when a unit of work material received between said grip element and said gripping surface is pulled horizontally from said hanger, said stationary gripping surface in horizontal section being curved to match the curvature of said body of revolution.

8. A hanger for use in a conveyorized system for transporting limp material from work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said finger portion, a grip element located adjacent said gripping surface, and support means supporting said grip element for movement in a vertical plane which is generally perpendicular to said gripping surface and along a path such that a said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit, at least one of said downwardly extending finger portions having an eye at its lower end for receiving a supplemental hanger.

9. A hanger for use in a conveyorized system for transporting limp material for work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said finger portions, a grip element located adjacent said gripping surface, support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit, a hanger rod extending vertically and slidably relatively to said hanger body, and means for adjustably fixing said hanger body to said hanger rod at any selected one of a number of points along the length of said hanger rod.

10. A hanger as defined in cliam 9 further chracterized by said hanger rod at its lower end protruding downwardly beyond said hanger body and being formed to provide an eye for receiving a supplemental hanger.

11. A hanger for use in a conveyorized system for transporting limp material from work station to work station, with a body having an upper portion and a plurality of grippers associated with said body for each releasably holding a unit of work material, a plurality of finger portions extendng downwardly from said upper portion, and said plurality of grippers each comprising a generally vertically extending stationary gripping surface on a respective one of said finger portions, a grip element located adjacent said gripping surface, and support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit, said support means of each gripper being a lever pivotally connected to one of said finger portions of said body and having a support arm portion carrying the associated grip element and locating it adjacent the associated gripping surface which is located on a neighboring one of said finger portions.

12. A hanger as defined in claim 11 further characterized by said grip element being a ball of generally spherical shape and having a diametral through hole receiving said supporting arm of said lever for supporting said ball for rotation relative to said arm.

13. A hanger as defined in claim 12 further characterized by a spring means associated with said lever for urging said lever in that direction of rotation about its axis of pivotal movement relative to the finger portion to which it is pivotally connected as to urge said ball grip element toward its associated gripping surface on said neighboring one of said finger portions.

14. A hanger as defined in claim 13 further characterized by said spring means being a helical compression spring having a lower end engaging the upper portion of said ball grip element and an upper end engaging said upper portion of said hanger body.

15. A hanger as defined in claim 13 further characterized by said spring means being a torsion spring located adjacent said pivot axis and working between said lever and said finger to which said lever is pivotally connected.

16. A hanger as defined in claim 14 further characterized by said ball grip element being slidably supported on said lever arm.

17. A hanger as defined in claim 15 further characterized means limiting the movement of said ball grip element in both directions along the length of said lever arm and substantially preventing such movement.

18. A hanger as defined in claim 11 further characterized by said lever being of a substantially L-shape with a substantially horizontal arm which is pivotally connected at one end to said one finger portion and which has said support arm extending generally upwardly from its other end.

19. A hanger for use in a conveyorized system for transporting limp material from work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said finger portions, a grip element located adjacent said gripping surface, and support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit,
said gripping surface of each of said downwardly extending finger portions of said body being provided by a roller supported on said finger for rotation relative to said finger portion about a generally vertical axis.

20. A hanger for use in a conveyorized system for transporting limp material from work station to work station, with a body having an upper portion and a plurality of grippers associated with said body for each releasably holding a unit of work material, a plurality of finger portions extending downwardly from said upper portion, and said plurality of grippers each comprising a generally vertically extending stationary gripping surface on a respective one of said portions, a grip element located adjacent said gripping surface, and support means supporting said grip element for movement in a vertical plane which is generally perpendicular to said gripping surface and along a path such that as said grip element moves upwardly relative to said gripping surface it moves horizontally away from said gripping surface and such that as said gripping element moves downwardly relative to said gripping surface it moves horizontally toward said gripping surface so that when a unit of work material is inserted between said gripping surface and said grip member the weight of said work unit and the engagement between said work unit and said grip element urges said grip element downwardly relative to said gripping surface and at the same time urges said grip element toward said gripping surface to increase the grip of said grip element and gripping surface on said work unit,
said grip element being a body of revolution rotatably supported on said support means so as to rotate relative to said support means when a unit of work material received between said grip element and said gripping surface is pulled horizontally from said hanger, and
said gripping surface of each of said downwardly extending finger portions of said body being provided by a roller supported on said finger portion for rotation relative to said finger portion about a generally vertical axis so that both said grip element and said roller element rotate when a unit of work material received between said grip element and said roller is pulled horizontally from said hanger.

* * * * *